United States Patent
Abondo

(10) Patent No.: US 8,000,248 B2
(45) Date of Patent: Aug. 16, 2011

(54) ROUTER AND METHOD FOR REFRESHING QUALITY OF SERVICE RESERVATION

(75) Inventor: Charles Abondo, Montrèal (CA)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 272 days.

(21) Appl. No.: 11/577,245

(22) PCT Filed: Oct. 14, 2004

(86) PCT No.: PCT/IB2004/052098
§ 371 (c)(1), (2), (4) Date: Jan. 14, 2008

(87) PCT Pub. No.: WO2006/040618
PCT Pub. Date: Apr. 20, 2006

(65) Prior Publication Data
US 2009/0041025 A1    Feb. 12, 2009

(51) Int. Cl.
*G01R 31/08* (2006.01)
*G06F 11/00* (2006.01)
*G06F 15/16* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/236; 370/229; 370/230; 370/231; 370/235; 370/237; 709/227; 709/228; 709/229

(58) Field of Classification Search ........... 370/229, 370/230, 231, 235, 236; 709/227, 228, 229
See application file for complete search history.

(56) References Cited

U.S. PATENT DOCUMENTS

| 6,101,549 | A * | 8/2000 | Baugher et al. | 709/238 |
| 7,269,657 | B1 * | 9/2007 | Alexander et al. | 709/229 |
| 2002/0015395 | A1 * | 2/2002 | Karagiannis | 370/338 |
| 2002/0087699 | A1 * | 7/2002 | Karagiannis et al. | 709/227 |
| 2002/0178247 | A1 | 11/2002 | Shaheen et al. | |
| 2003/0026232 | A1 | 2/2003 | Uskela | |
| 2003/0214910 | A1 * | 11/2003 | Ikeda et al. | 370/236 |

FOREIGN PATENT DOCUMENTS
EP    1383285 A1    1/2004

OTHER PUBLICATIONS

RFC 2205; R. Braden, Ed.et al; "Resource ReSerVation Protocol (RSVP)—Version 1 Functional Specification"; Network Working Group; Request for Comments: 2205; Sep. 1997. R. Braden et al., Resource ReSerVation Protocol (RSVP), Network Working Group, RFC 2205, Sep. 1997.
Silvano Gai et al., RSVP Proxy, Network Working Group, Internet Draft, Mar. 2002.
Lou Berger et al., RSVP Refresh Reduction Extensions, Network Working Group, Internet Draft, Oct. 1999.
Sarantis Paskalis et al., RSVP Mobility Proxy, Internet Draft, Dec. 15, 2001.
PCT Search Report from corresponding application PCT/IB2004/052098.

* cited by examiner

*Primary Examiner* — Ayaz R Sheikh
*Assistant Examiner* — Tarell Hampton
(74) *Attorney, Agent, or Firm* — Alex Nicolaescu; Ericsson Canada Inc.

(57) ABSTRACT

A method and an associated router in first administrative domain of a telecommunications network wherein the first administrative domain comprises a first end point associated to a reservation for a session transiting through the router between the first end point and a second end point in a second administrative domain. The router comprises a quality of service (QoS) reservation module maintaining a refresh timer associated with the reservation. The QoS reservation module is capable of, upon expiration of the refresh timer, sending a refresh reservation message toward the second end point on behalf of the first end point and, upon reception of a refresh confirmation message to the refresh reservation message, resetting the refresh timer without forwarding the refresh confirmation message toward the first end point.

8 Claims, 3 Drawing Sheets

ROUTER AND METHOD FOR REFRESHING QUALITY OF SERVICE RESERVATION

TECHNICAL FIELD

The present invention relates to reservation of resources in a network and more precisely to reserving and refreshing quality of service reservation of resources on the network via a proxy node.

DESCRIPTION OF THE RELATED ART

Historically, voice traffic in telecommunications network has been transiting over reserved circuit switching resources. Packet switched resources had been used for data traffic, but are now being genuinely used for voice traffic using, for instance, Voice over Internet Protocol (VoIP). This is more efficient, but leads to new problems concerning the quality of service (QoS) guaranties since the IP packet switching protocols is a best effort network. In other words, IP networks do not provide QoS guaranties as such and mechanisms need to be added thereto to overcome the situation.

Other challenges of the present telecommunications network include enabling efficient establishment and maintenance of the QoS guaranties (i.e. the establishment should not affect the perceived QoS). It must also be possible to establish the QoS guaranties between two end points located in distant networks not sharing the same administrative domain. For instance, the establishment of the QoS guaranties should be possible between two users of two networks owned by two different operators. In this example, as can be foreseen, each operator refrains the other operator from monopolizing resources on its network without its consent (explicit or implicit).

At the moment, reservation of resource in various networks can be done via the well known RSVP mechanism (IETF: RFC 2205). In RSVP, a reservation is defined between to end points for a given type of communication or protocol. The reservation mechanism of RSVP uses a first message (PATH) sent from the emitter of the communication toward the other end. Each network equipment on the way therebetween simply forwards the PATH message up to its destination. The destination replies with a reservation message (RESV) that follows the same path as the PATH message. The RESV message reserves the resources in each network equipment on its way back to the source of the PATH message. Since the reservation is valid for traffic transiting in only one direction, a typical conversation between two parties also requires the same reservation to be made by the other end (or destination) of the communication toward the emitter thereof. After establishment of the communication, each end needs to refresh the reservation at regular interval otherwise the reservation is abandoned by the network equipment. Important prerequisites to RSVP are that all network equipment between the end points need to be compatible therewith and they also need to agree on the interval at which the reservation need to be refreshed.

Some attempts were done to enable RSVP to be adapted to networks where all network equipment is not compatible with RSVP. The principle applied in such cases is to use the last network equipment compatible with RSVP as a proxy of the end point. The proxy RSVP end point therefore answers the PATH message addressed to the end point with a RESV message on behalf of the end point. The result is that the emitter of the communication sees the reservation as valid up to the destination end point even though it is interrupted by the proxy RSVP end point. It does not address the need for a reservation to transit between different administrative domains.

Another prior art solution aimed at reducing overhead created by the RSVP refresh procedure. It enables a shorter refresh message to be used in lieu of the one specified in the original RSVP. The solution also provided a mechanism to ensure reliability of the refresh messages by re-emitting lost messages. It does not address the need for a reservation to be maintained efficiently in different administrative domains.

As can be appreciated, efficient establishment and maintenance of the QoS guaranties related to voice traffic transiting over packet switched resources for end points located in different administrative domains cannot be provided by the prior art solutions. The present invention provides such a solution.

SUMMARY OF THE INVENTION

A first aspect of the present invention is directed to a router in first administrative domain of a telecommunications network wherein the first administrative domain comprises a first end point associated to a reservation for a session transiting through the router between the first end point and a second end point in a second administrative domain. The router comprises a quality of service (QoS) reservation module maintaining a refresh timer associated with the reservation. The QoS reservation module is capable of, upon expiration of the refresh timer, sending a refresh reservation message toward the second end point on behalf of the first end point and, upon reception of a refresh confirmation message to the refresh reservation message, resetting the refresh timer without forwarding the refresh confirmation message toward the first end point.

Optionally, the QoS reservation module of the router is further capable of, upon expiration of the refresh timer, refreshing the reservation in the router. The router may further comprise a refresh state maintained by the QoS reservation module and to which the refresh timer is associated.

A second aspect of the present invention is directed to a method of refreshing a reservation established for a session between a first end point in a first administrative domain and a second end point in a second administrative domain. The reservation is valid in the first administrative domain between the first end point and a router. The method comprises the steps of maintaining a refresh timer in the router related to the reservation. Upon expiration of the refresh timer, the method further comprises a step of sending a refresh reservation message from the router toward the second end point on behalf of the first end point and, upon reception of a refresh confirmation message to the refresh reservation message, resetting the refresh timer without forwarding the refresh confirmation message toward the first end point.

Optionally, the method may further comprise a step of, upon expiration of the refresh timer, refreshing the reservation in the router.

A third aspect of the present invention is directed to a router in a first administrative domain of a telecommunications network, the first administrative domain comprising a first end point associated to a session transiting through the router between the first end point and a second end point in a second administrative domain.

The router comprises a quality of service (QoS) reservation module maintaining a reservation table associated with the session. The QoS reservation module is capable of, upon reception of a first reservation message from the first end point addressed to the second end point, establishing a first reservation for traffic related to the session issued from the first end point to the second end point by adding a corresponding first record in the reservation table. In such a case, the first record comprises an address of the first end point as the source of the traffic, an address of the second end point as the destination of the traffic and a first associated QoS level in accordance with the received first reservation message. The QoS reservation module is further capable of replying with an acknowledge message confirming the first reservation back to the first end point on behalf of the second end point before sending a second reservation message toward the first end point on behalf of the second end point. The second reservation message relates to traffic related to the session issued from the second end point to the first end point. The QoS reservation module is further capable of establishing a second reservation in accordance with the second reservation message by adding a corresponding second record in the reservation table wherein the second record comprises an address of the second end point as the source of the traffic, the address of the first end point as the destination of the traffic and a second associated QoS level in accordance with the sent second reservation message.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE PREFERRED EMBODIMENTS

The present invention provides a mechanism optimizing the reservation of resources best fitted for resource-limited networks by proxying the reservation establishment, the reservation refresh and the reservation update. The terminology used in the following description could be seen as similar to the one used in the prior art RSVP, but do not limit the present invention to characteristics of the RSVP.

Figure 1:
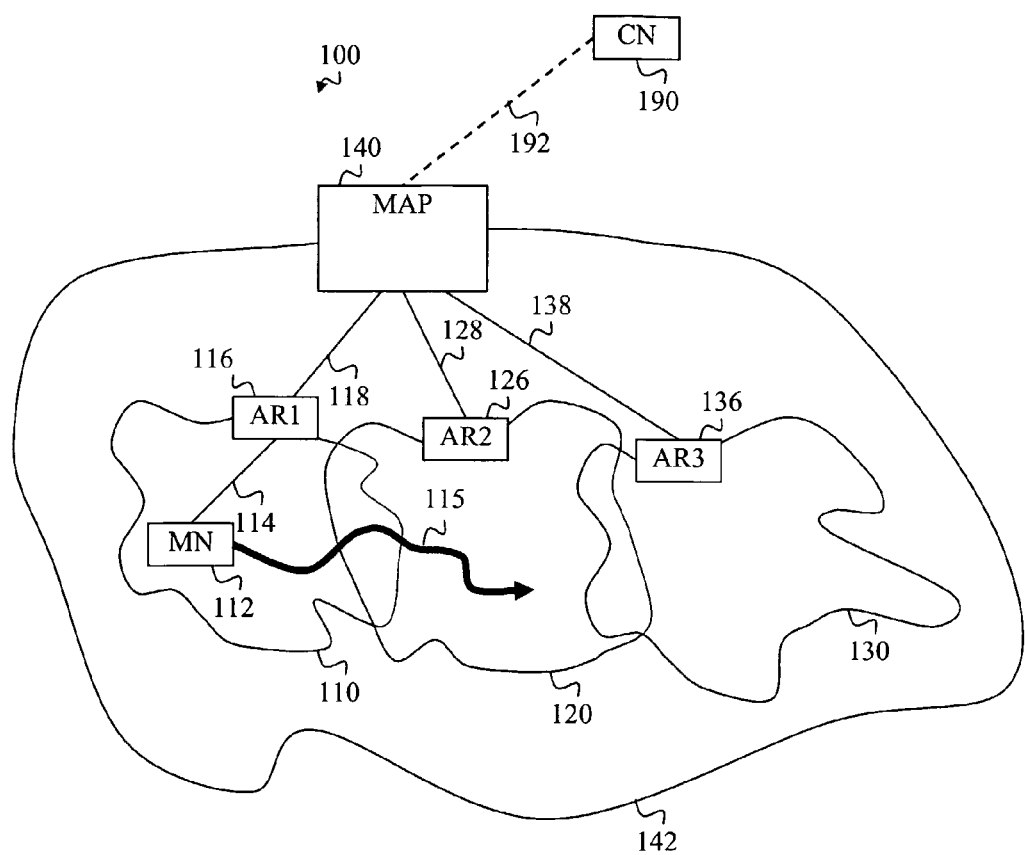
FIG. 1 is an exemplary network topology in accordance with the teachings of the present invention.

Reference is made to the drawings where FIG. 1 shows an exemplary network 100 topology in accordance with the teachings of the present invention. FIG. 1 shows a mobile node (MN) 112 involved in a session with a correspondent node (CN) 190 via various pieces of network equipment. The MN 112 is connected to a first access router (AR1) 116 through a link 114. In usual implementations, the link 114 is formed by multiple network equipment and, therefore, by multiple sublinks not shown for clarity purposes. The sublinks may also be completely or partly wireless. The AR1 116 is further connected to a Mobile Anchor Point (MAP) 140 through a link 118. Just like the link 114 and other links 128, 138 and 192 shown on FIG. 1, the link 118 is usually composed of multiple sublinks of various types not shown for clarity purposes.

The MAP 140 is, in turn connected, to the CN 190 through the link 192. The AR1 116 defines a first coverage area 110 in which the MN 112 is located. Other access routers AR2 126 and AR3 136 further define respective coverage areas 120 and 130. The MAP 140 defines a first administrative domain 142 comprising the coverage areas 110, 120 and 130. The number of coverage areas and access routers in a typical network implementing the invention shown using the exemplary network 100 is higher than three, but this has been chosen as an illustrative example. The link 192 is shown in dotted line since it is unlikely that a direct link between the MAP 140 and the CN 190 could exist. The link 192, in typical implementations, would cross another administrative domain's boundary (not shown) before reaching the CN 190. The MN 112 is further shown moving in time toward the second coverage area 120 (arrow 115).

Figure 2:
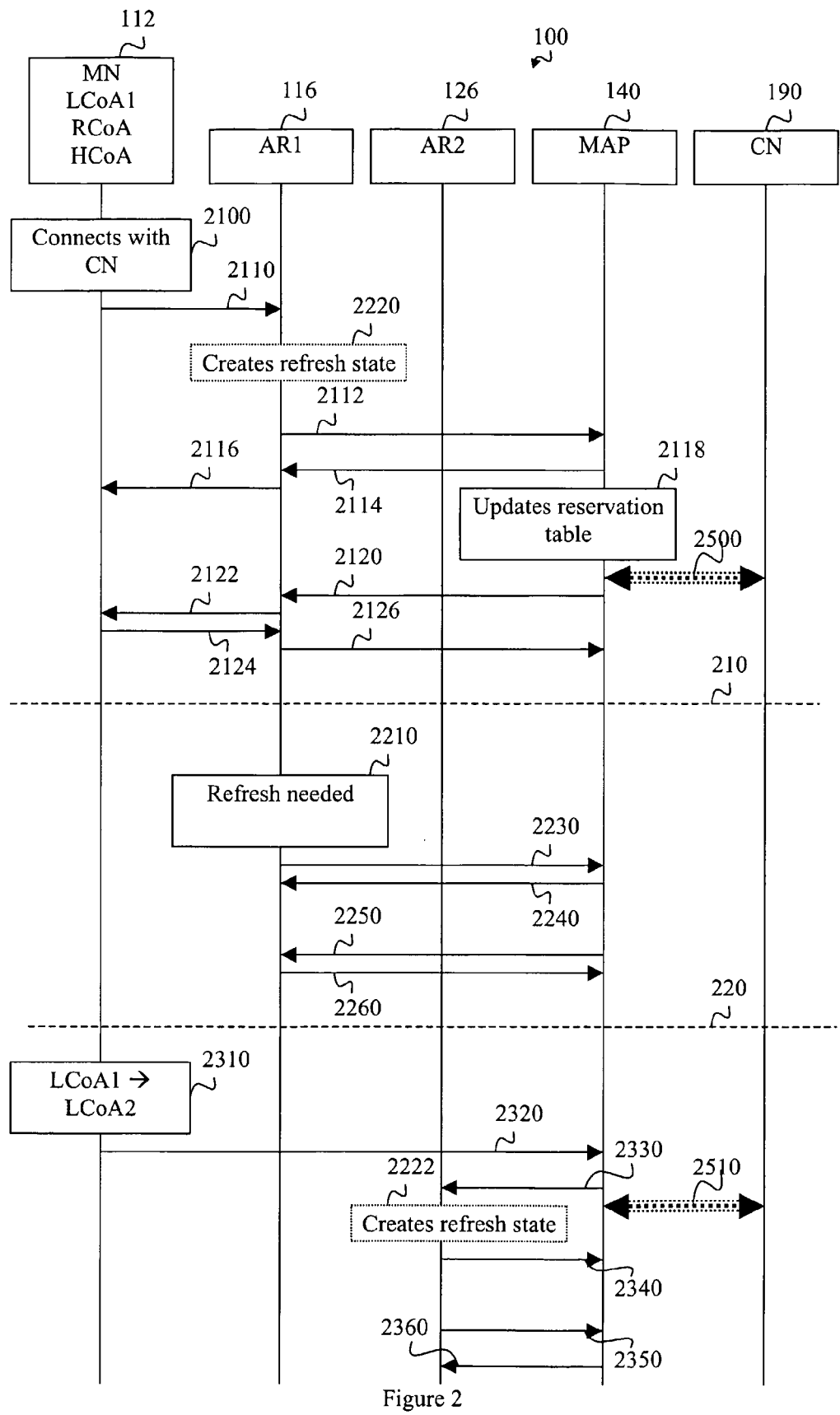
FIG. 2 is a nodal operation and flow chart of mechanisms in accordance with the teachings of the present invention.

Reference is now made concurrently to FIG. 1 and FIG. 2, which shows a nodal operation and flow chart of mechanisms in accordance with the teachings of the present invention. The MN 112, the AR1 116, the AR2 126, the AR3 136, the MAP 140 and the CN 190 are shown on FIG. 2. The MN 112 has three addresses LCoA1, RCoA and HoA associated therewith. LCoA1 is an address, typical IPv6, valid within the first coverage area 110. The RCoA is an address, typical IPv6, valid in the administrative domain 142. HCoA or HA is a home address, typically IPv6, that is associated with the MN 112 permanently. Various addresses and ways of assigning the addresses, which fall outside the scope of the present invention, can be used as long as the validity thereof is guaranteed within their respective applicable zone. FIG. 2 shows three scenarios separated by dotted lines 210 and 220. All three scenarios work together in a typical implementation of the present invention. However, each scenario may be implemented independently from the others in view of the needs and the characteristics of the existing infrastructure.

In the first scenario (above line 210), the MN 112 connects with the CN 190 in the session (step 2100). Various messages (not shown) may usually be exchanged between the MN 112, the CN 190 and various intermediate nodes. The present invention does not address these exchanges, but rather comes into consideration for QoS reservation related to the session (established already or currently establishing). In order to reserve the resources within the administrative domain 142, the MN 112 sends a first reservation message 2110 addressed to the CN 190 toward the AR1 116 to reserve resources for all traffic related to the session sent from the MN 112 toward the CN 190. In typical implementations, the reservation message 2110 contains QoS requirements related thereto. However, it is possible that the QoS requirements to be implicitly applied in view, for instance, of other information exchanged during establishment of the session or in view of the identity (e.g. addresses, client authentication, etc.) of the end points involved.

Upon reception of the first reservation message 2110, the AR1 116 may create a refresh state (step 2220), which is used in case of implementation of the second scenario shown between lines 210 and 220, as will be shown later. The AR1 116 further reserves the resources in view of the QoS requirements and sends a second reservation message 2112 toward the MAP 140. The MAP 140 then updates a reservation table step 2118) containing a record associating the QoS requirements of the session with the MN 112 as the source and the CN 190 as the destination. The MAP 140 further replies to the first reservation message 2112 with an acknowledge message 2114 on behalf of the CN 190 just as if the acknowledge message 2112 had been sent therefrom and forwarded on the link 192 up to the MAP 140 and, then, to the AR1 116 on the link 118. The step 2118 of updating the reservation table can be done before or after the step of sending the acknowledge message 2114 without affecting the functioning of the present invention. The MAP 140 then sends a third reservation message 2120 on behalf of the CN 190 toward the AR1 116 to reserve resources for traffic related to the session transiting from the CN 190 toward the MN 112. The AR1 116 may then reserve the relevant resources and send a fourth reservation message 2122 toward the MN 112. The MN 112 then replies with an acknowledge message 2124 addressed to the CN 190 toward the AR1 116, which is forwarded thereby toward the MAP 140 in an acknowledge message 2126. The step 2118 of updating the table may further comprise a step of updating or adding a record to associate the QoS requirements of the session with the MN 112 as the destination and the CN 190 as the source. Again, these steps could be done in various orders for various reasons without affecting the general results of the present invention. The MAP 140 may further optionally exchange messages represented on FIG. 2 by the triple dotted line 2500 in order to establish reservation of resources in the whole or part of the link 192. This may not be necessary due to existing Service Level Agreements (SLA) existing between the MAP 140 and other entities. The type or need for such reservation fall outside the scope of the present invention. It is, however, interesting to note that the CN 190 could be located in a further administrative domain similar to the administrative domain 142. In such a case, the present invention would enable a reservation to be made in the further administrative domain by a further MAP similar to the MAP 140 on behalf of the MN 112 even though no reservation between the MAP 140 and the further MAP exists.

The second scenario is shown between lines 210 and 220. In order to refresh an established reservation, the AR1 116 could create a refresh state as shown earlier by the step 2220. The refresh state could comprise a refresh timer set from any of the reservation messages 2110, 2114, 2120 and 2122 or implicitly from configuration or the like. The AR1 116 determines that a refresh of the existing reservation from the MN 112 toward the CN 190 is needed upon expiration of the refresh timer or by any other ways (step 2210). It then sends a refresh reservation message 2230 toward the MAP 140 on behalf of the MN 112 and receives an acknowledge message 2240, related thereto, addressed from the CN 190. The AR1 116 may further update its own reservation upon sending the refresh reservation message 2230. The acknowledge message 2240 is sent by the MAP 140 on behalf of the CN 190 upon reception of the refresh reservation message 2230. The MAP 140 then sends a further refresh reservation message 2250 on behalf of the CN 190 upon determining that a refresh is needed for the reservation from the CN 190 toward the MN 112. The determination could be done, for instance, via a refresh timer of a refresh state similar to the refresh state maintained by the AR1 116 or may be triggered by the reception of the refresh reservation message 2230 addressed from the MN 112 received from the AR1 116.

In the third scenario (below line 220), the MN 112 moves from the first coverage area 110 toward the second coverage area 120 under the responsibility of the AR2 126 (arrow 115). Since the LCoA1 is valid only within the first coverage area 110, the MN 112 needs to obtain a second address (LCoA2) valid in the second coverage area 120 (step 2310). This is usually achieved upon detection by the MN 112 or the AR1 116 or the AR2 126 that the MN 112 is leaving the first coverage area 110. When and how this is achieved is outside of the scope of the present invention. Moreover, the way LCoA2 is communicated between the MN 112 and the AR2 126 is also outside of the scope of the present invention. However, when the MN 112 receives the LCoA2, it needs to change the ongoing reservations. This may involve updating the reservations maintained in the MAP 140 even though the usual implementation would use the RCoA in identifying the reservations therein. The address modification needs to trigger the reservation of resources in the AR2 126. In order to do so, the MN 112 sends an address modification notification 2320 toward the MAP 140, which sends a reservation message 2330 on behalf of the CN 190. The AR2 126 sends an acknowledge message 2340 related to the received reservation massage 2330. The AR2 126 may further create a refresh state 2222 used in the second scenario described between lines 210 and 220. The AR2 126 also sends a further reservation message 2350 on behalf of the MN 112 toward the CN 190. The MAP 140 acknowledges the further reservation message 2350 with a further acknowledge message 2360 sent on behalf of the CN 190 toward the MN 112. The AR2 126 does not need to forward the acknowledge message 2360 to the MN 112.

Figure 3:
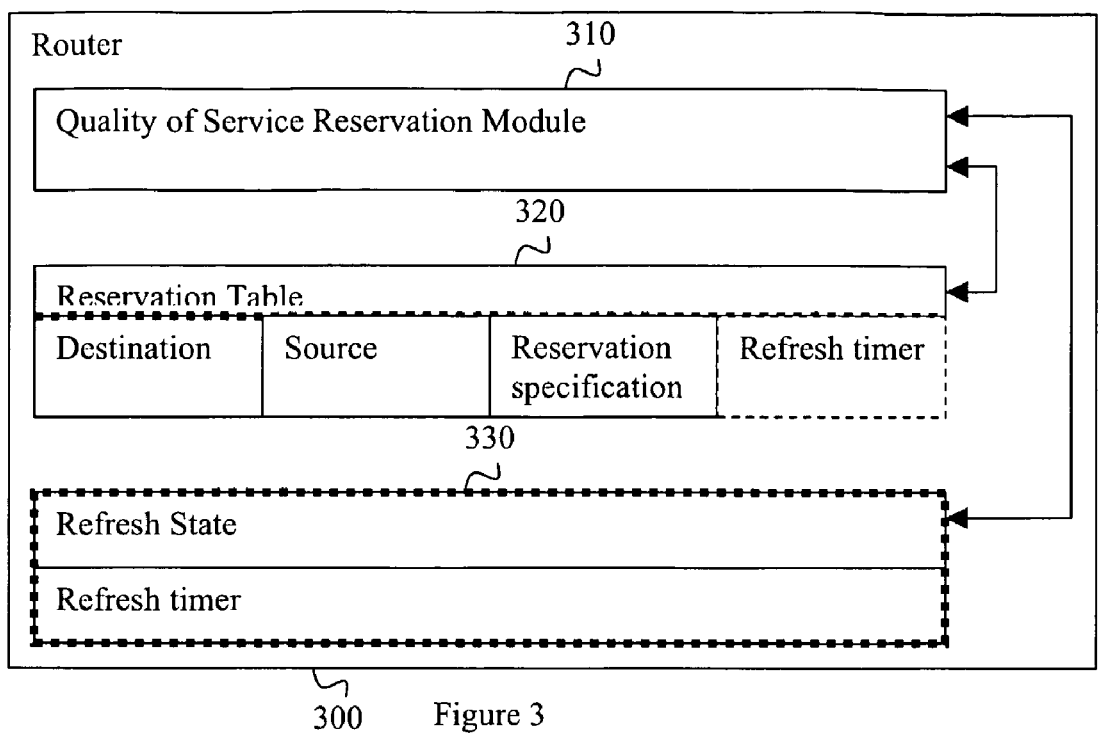
FIG. 3 is a modular representation of a router in accordance with the teachings of the present invention.

FIG. 3 shows a modular representation of a router 300 in accordance with the teachings of the present invention. The router 300 is a generalization of the MAP 140 and the AR1 116 (or AR2 126 and AR3 136). It comprises a quality of service reservation module 310 and, optionally, may comprise a reservation table 320 and a refresh state 330. The refresh timer mentioned in the second scenario could be maintained in the reservation table 320 (as shown by the dotted box) or may be comprised in the refresh state 330. The quality of service module 310 may be capable of implementing the present invention completely or partially as described above. More specifically, an example is taken where the router 300 is located in a first administrative domain comprising a first end point. The first end point is associated to a session transiting through the router 300 between the first end point and a second end point in a second administrative domain. The reservation module 310 maintains the reservation table 320 associated with the session. The QoS reservation module 310 is capable of, upon reception of a first reservation message from the first end point addressed to the second end point, establishing a first reservation for traffic related to the session issued from the first end point to the second end point by adding a corresponding first record in the reservation table 320. The first record comprises an address of the first end point as the source of the traffic, an address of the second end point as the destination of the traffic and a first associated QoS level in accordance with the received first reservation message. Further to this reservation message, the QoS reservation module 310 is further capable of replying with an acknowledge message confirming the first reservation back to the first end point on behalf of the second end point and sending a second reservation message toward the first end point on behalf of the second end point. In such a case, the second reservation message relates to traffic related to the session issued from the second end point to the first end point. The QoS reservation module 310 is also further capable of establishing a second reservation in accordance with the second reservation message by adding a corresponding second record in the reservation table 320. Similarly to the first one, the second record comprises an address of the second end point as the source of the traffic, the address of the first end point as the destination of the traffic and a second associated QoS level in accordance with the sent second reservation message.

The QoS reservation module 310 may also maintain the refresh state 330 and the refresh timer associated with the reservation. In such an example, the QoS reservation module 310 is capable, upon expiration of the refresh timer associated to the refresh state or in the reservation table 320, of sending a refresh reservation message toward the second end point on behalf of the first end point; and upon reception of a refresh confirmation message to the refresh reservation message, resetting the refresh timer of the refresh state without forwarding the refresh confirmation message toward the first end point. The QoS reservation module 310 may further be capable of, upon expiration of the refresh timer associated to the refresh state, refreshing the reservation in the router 300.

Furthermore, the QoS reservation module 310 may be capable of receiving an address modification notification related to the reservation from the first end point through the first access router. The address modification notification indicates that the first end point changes from a first address valid with the first access router to a second address valid with a second access router since the first end point is changing from the first access router to the second access router. Thereafter, the QoS reservation module 310 is capable of issuing a first reservation message on behalf of the second end point toward the second access router. The QoS reservation module may further be capable of updating a first record related to the first end point and its first address in view of the address modification notification in the reservation table 320 and receiving an acknowledge message addressed from the first end point issued from the second access router concerning the first reservation message.

In this last example, the end point having the first address needs to be capable of, upon detection of a need for a change from the first access router to the second access router issuing the address modification notification related to the reservation toward a domain router (MAP in the previous examples). The address modification notification indicates, as mentioned earlier, that the end point changes its first address for the second address since the end point is changing from the first access router to the second access router. This capability of the end point could be implemented in a QoS reservation module therein (not shown). The QoS reservation module of the end point may further be capable of obtaining the second address from the second access router or the domain router prior to sending the address modification notification.

Although several preferred embodiments of the present invention have been illustrated in the accompanying drawings and described in the foregoing description, it will be understood that the invention is not limited to the embodiments disclosed, but is capable of numerous rearrangements, modifications and substitutions without departing from the teachings of the present invention. For example, even though the figures present simple and linear scenarios to facilitate understanding, this is not to be construed as a pre-requisite thereof. Indeed, the solution applies to networks of arbitrary topology and is also fitted to large topologies. In general, statements made in the description of the present invention do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

The invention claimed is:

1. A router in a first administrative domain of a telecommunications network, the first administrative domain comprising a first end point associated to a session transiting through the router between the first end point and a second end point outside of the first administrative domain, the router comprising:

a quality of service (QoS) reservation module for maintaining a reservation table associated with the session, the QoS reservation module by upon reception of a first reservation message addressed from the first end point to the second end point:

establishing a first reservation for traffic related to the session issued from the first end point to the second end point by adding a corresponding first record in the reservation table, the first record comprising an address of the first end point as the source of the traffic, an address of the second end point as the destination of the traffic and a first associated QoS level in accordance with the received first reservation message;

replying with an acknowledge message confirming the first reservation back toward the first end point, wherein the acknowledge message is generated on behalf of the second end point;

sending a second reservation message toward the first end point, wherein the second reservation message is generated on behalf of the second end point and relates to traffic related to the session issued from the second end point to the first end point; and establishing a second reservation in accordance with the second reservation message by adding a corresponding second record in the reservation table, the second record comprising an address of the second end point as the source of the traffic, the address of the first end point as the destination of the traffic and a second associated QoS level in accordance with the sent second reservation message.

2. The router of claim 1 wherein the QoS reservation module further receives a further acknowledge message confirming the second reservation addressed from the first end point to the second end point.

3. The router of claim 1 wherein the QoS reservation module further:

following addition of the first record, sets a first refresh timer associated with the first reservation; and following addition of the second record, sets a second refresh timer associated with the second reservation.

4. The router of claim 3 wherein the QoS reservation module further:

upon expiration of the first refresh timer, sends a refresh reservation message toward the second end point on behalf of the first end point; and upon reception of a refresh confirmation message to the refresh reservation message, resets the first refresh timer without forwarding the refresh confirmation message toward the first end point.

5. The router of claim 3 wherein the QoS reservation module further:

upon expiration of the second refresh timer, sends a refresh reservation message toward the first end point on behalf of the second end point; and upon reception of a refresh confirmation message to the refresh reservation message, resets the second refresh timer without forwarding the refresh confirmation message toward the second end point.

6. A method for establishing QoS reservations in a router of a first administrative domain of a telecommunications network, the first administrative domain comprising a first end point associated to a session transiting through the router between the first end point and a second end point outside of the first administrative domain, the method comprising the steps of:

upon reception in the router of a first reservation message addressed from the first end point to the second end point:

establishing a first reservation for traffic related to the session issued from the first end point to the second end point by adding a corresponding first record in the reservation table, the first record comprising an address of the first end point as the source of the traffic, an address of the second end point as the destination of the traffic and a first associated QoS level in accordance with the received first reservation message;

replying with an acknowledge message confirming the first reservation back toward the first end point, wherein the acknowledge message is generated on behalf of the second end point;

sending a second reservation message toward the first end point, wherein the second reservation relates to traffic related to the session issued from the second end point to the first message is generated on behalf of the second end point and end point; and establishing a second reservation in accordance with the second reservation message by adding a corresponding second record in the reservation table, the second record comprising an address of the second end point as the source of the traffic, the address of the first end point as the destination of the traffic and a second associated QoS level in accordance with the sent second reservation message.

7. A router in a first administrative domain of a telecommunications network, the first administrative domain comprising a first end point associated to a session transiting through the router between the first end point and a second end point outside of the first administrative domain, the router comprising:

a quality of service (QoS) reservation module for maintaining a reservation table associated with the session, the QoS reservation module by:

during the session and upon reception of an address modification notification from the first end point stating that the first end point is assigned a new address valid with a further router inside the first administrative domain:

sending a reservation message toward the further router, wherein the reservation message is generated on behalf of the second end point and relates to traffic related to the session issued from the second end point to the first end point; and receiving an acknowledge message confirming the reservation message, the acknowledge message being sent by the further router on behalf of the first end point.

8. The router of claim 7 wherein the QoS reservation module further:

receives a further reservation message addressed to the second end point, wherein the further reservation message relates to traffic related to the session issued from the first end point to the second end point and is sent by the further router on behalf of the first end point; and sends a further acknowledge message towards the further router on behalf of the second end point thereby acknowledging the further reservation message.

* * * * *